US009418308B2

(12) United States Patent
Patrick et al.

(10) Patent No.: US 9,418,308 B2
(45) Date of Patent: *Aug. 16, 2016

(54) AUTOMATIC EVALUATION OF LINE WEIGHTS

(71) Applicant: BrandFast LLC, Memphis, TN (US)

(72) Inventors: Robert Patrick, Alta Loma, CA (US); David E. Tate, Memphis, TN (US); Melanie Ouzts, Cleveland, MS (US); Marieke Mcclure, Walnut, MS (US)

(73) Assignee: BrandFast LLC

( * ) Notice: Subject to any disclaimer, the term of this patent is extended or adjusted under 35 U.S.C. 154(b) by 224 days.

This patent is subject to a terminal disclaimer.

(21) Appl. No.: 14/108,577

(22) Filed: Dec. 17, 2013

(65) Prior Publication Data

US 2014/0105507 A1    Apr. 17, 2014

Related U.S. Application Data

(63) Continuation of application No. 12/853,952, filed on Aug. 10, 2010, now Pat. No. 8,644,618.

(51) Int. Cl.
*G06K 9/46* (2006.01)
*G06T 11/20* (2006.01)

(52) U.S. Cl.
CPC ............ *G06K 9/4604* (2013.01); *G06T 11/203* (2013.01)

(58) Field of Classification Search
CPC ......... G06T 11/60; G06T 3/40; G06T 3/4023; G06T 2207/30124; G06K 9/4604; G06K 9/036; B41J 2/2132; D05B 19/08
See application file for complete search history.

(56) References Cited

U.S. PATENT DOCUMENTS

| 7,693,333 | B2 | 4/2010 | Ryu et al. | |
|---|---|---|---|---|
| 8,644,618 | B2 * | 2/2014 | Patrick | G06T 11/203 358/448 |
| 2001/0024519 | A1 | 9/2001 | Ohki et al. | |
| 2002/0126305 | A1 | 9/2002 | Keithley et al. | |
| 2003/0101017 | A1 | 5/2003 | Dougherty et al. | |
| 2007/0199466 | A1 | 8/2007 | Franz | |
| 2009/0046930 | A1 | 2/2009 | Lee et al. | |
| 2010/0165118 | A1 * | 7/2010 | Honeck | B41F 31/045 348/207.2 |

OTHER PUBLICATIONS

In the U.S. Patent and Trademark Office, Notice of Allowance in re: U.S. Appl. No. 12/853,952, dated Sep. 30, 2013, 9 pages.

(Continued)

*Primary Examiner* — Kim Vu
*Assistant Examiner* — Michael Vanchy, Jr.
(74) *Attorney, Agent, or Firm* — Porzio, Bromberg & Newman P.C.

(57) ABSTRACT

Systems and methods may automatically evaluate printed line weights in an image composition. An image composition may be received and the number of horizontal and vertical rows of pixels may be determined. The number of positive pixels in each of the horizontal and vertical rows may then be determined. An actual size of a pixel may be calculated. The actual size of a pixel may be multiplied by the number of positive pixels in each of the horizontal rows and each of the vertical rows to determine a positive line weight of each of the horizontal rows and each of the vertical rows. A predetermined minimum permissible positive line weight for the image composition may be identified and compared to the positive line weight of each of the horizontal rows and each of the vertical rows.

19 Claims, 9 Drawing Sheets

(56) References Cited

OTHER PUBLICATIONS

In the U.S. Patent and Trademark Office, Final Office Action in re: U.S. Appl. No. 12/853,952, dated Jun. 26, 2013, 13 pages.

In the U.S. Patent and Trademark Office, Office Action in re: U.S. Appl. No. 12/853,952, dated Oct. 15, 2012, 11 pages.

International Search Report and Written Opinion in related application PCT/US11/46961, mailed Jan. 18, 2012.

* cited by examiner

| Horizontal | | Vertical | |
|---|---|---|---|
| 2 px | 2 occurrences | 1 px | 2 occurrences |
| 4 px | 3 occurrences | 2 px | 1 occurrence |
| 5px | 1 occurrence | 4px | 1 occurrence |
| 6px | 2 occurrences | 5px | 2 occurrences |
| 7px | 1 occurrence | 6px | 1 occurrence |
| 8px | 1 occurrence | 8px | 1 occurrence |
| | | 10px | 1 occurrence |

| Total occurrences table: | |
|---|---|
| 1px | 2 occurrences |
| 2px | 3 occurrences |
| 4px | 4 occurrences |
| 5px | 3 occurrences |
| 6px | 3 occurrences |
| 7px | 1 occurrence |
| 8px | 2 occurrences |
| 10px | 1 occurrence |

Figure 3

| Waiver Percentage | Index Value | Minimum Line Weight Returned |
|---|---|---|
| 0.000 – 0.124 | 0 | 1 |
| 0.125 – 0.249 | 1 | 2 |
| 0.250 – 0.374 | 2 | 4 |
| 0.375 – 0.499 | 3 | 5 |
| 0.500 – 0.624 | 4 | 6 |
| 0.625 – 0.749 | 5 | 7 |
| 0.750 – 0.824 | 6 | 8 |
| 0.825 – 0.999 | 7 | 10 |

Figure 4

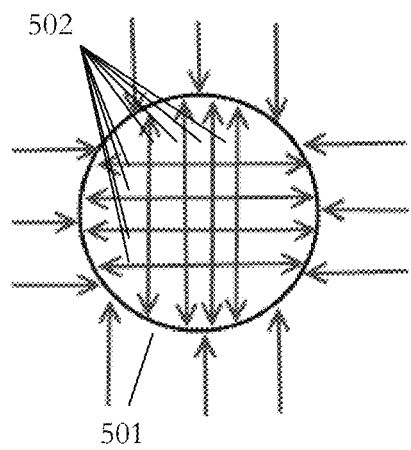
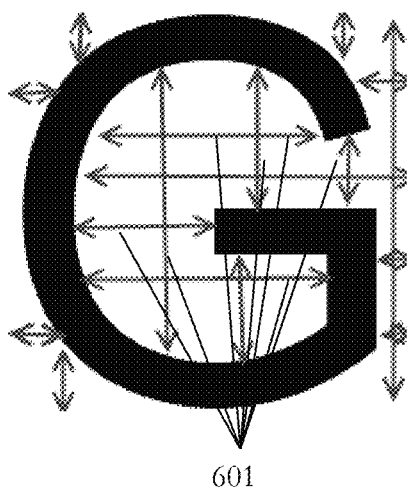
Figure 5            Figure 6
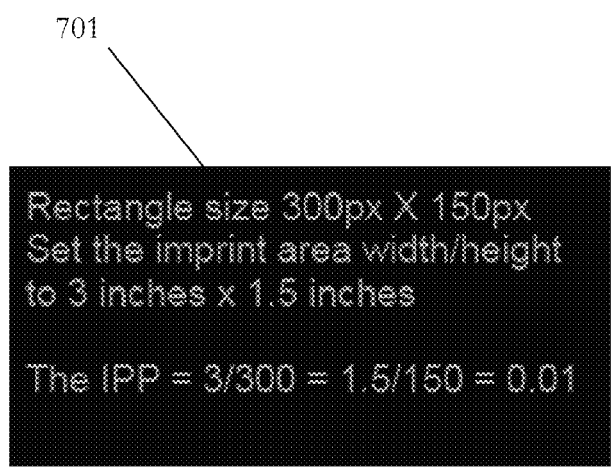
Figure 7

AUTOMATIC EVALUATION OF LINE WEIGHTS

CROSS-REFERENCE TO RELATED APPLICATIONS

This application is a continuation of U.S. patent application Ser. No. 12/853,952 filed April Aug. 10, 2010, the contents of which is incorporated by reference herein in its entirety.

FIELD OF THE INVENTION

The present invention relates, in general, to systems and methods for evaluating positive and negative line weights of an image or collection of images, and systems and methods for evaluating line weights of submitted images.

BACKGROUND OF THE INVENTION

In the following discussion certain articles, methods, patents, and publications may be described for background and introductory purposes. Nothing contained herein is to be construed as an "admission" of prior art. Applicant expressly reserves the right to demonstrate, where appropriate, that the articles and methods referenced herein do not constitute prior art under the applicable statutory provisions.

Custom imprinted promotional materials represent a large and dynamic segment of the advertising industry. Many companies choose to spend a portion of their advertising budgets each year on purchasing and distributing promotional items that have been imprinted with company logos or other customer designated text or images. This form of advertising provides many benefits relative to other forms of promotion. Many custom imprinted promotional items are both durable in nature and perform some useful function. These items, therefore, stay in the hands of potential customers much longer than other forms of advertising and remind them of the company whose logo and/or message are printed thereon. Custom imprinted promotional materials can also generate traffic and/or excitement for a new product or business. A business attending a tradeshow or opening a new storefront, for example, might give away a unique or desirable promotional item with its logo imprinted thereon to encourage attendees to visit its booth or new location. These are but a few of the many reasons custom imprinted promotional materials are popular.

The range of products that can be custom imprinted is virtually limitless. Every sort of product including simple paper goods, textiles, product samples, tools, electronic devices, etc. are available with custom imprinted promotional messages on them. The foregoing list is, of course, only a sample of the many custom imprinted promotional items available and is not intended as an exhaustive list. The wide range of products available for custom imprinting, however, can create problems for those performing this custom imprinting work.

Each individual product typically has a unique, predefined printable surface area that is constrained by the size/geometry of the product to be imprinted and the printing method/apparatus used, among other constraints. Because the available printing area varies with the product to be imprinted, it is necessary to have a method for assessing whether the space available on any particular product is adequate for the image (s) and/or text to be imprinted thereon. This assessment is highly dependant upon the nature and design of the image(s) and/or text supplied. For example, for any given printing equipment and technique there is some minimum print size for an image or text. Attempting to print text or images that are too small will result in substandard print quality, possibly rendering the image illegible and/or unintelligible. Similarly, there exists some minimum separation that must be maintained between printed elements to maintain the quality and legibility of the printed image and/or text. Therefore, if the image supplied contains printed elements that are too close to one another, the final printed product will be of poor quality.

Traditionally, custom printing businesses maintain large graphic arts departments to evaluate the positive and negative line weights of submitted artwork and/or text to determine whether it is suitable for printing on a particular product. This is time consuming and costly as a trained human must perform the measurements and calculations by hand. It is therefore one objective of certain embodiments of the invention to provide a means of quickly evaluating the positive and negative line weights of an image or collection of images. It is another objective of certain embodiments of the present invention to provide a means of automating such a process such that human intervention and/or judgment is not necessary in calculating positive or negative line weights. It is yet another objective of certain embodiments of this invention to provide an automated means for checking to see whether the negative or positive line weights of an image or collection of images violates the minimum thresholds for printing on a selected object and/or by a particular method. Yet another objective is to provide a method and apparatus for permitting customers to configure custom printed products without oversight by a graphic artist or other trained professional and ensure that the final product will meet customer expectations and quality standards.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings:

FIG. 3 is a table showing the total occurrence of each line weight found in FIG. 1.

FIG. 4 is a table showing the relationship between a chosen waiver percentage and the minimum line weight that may be returned for FIG. 1 when evaluated according to certain embodiments.

FIG. 5 is a picture of a circle with lines indicating the possible rows and columns that could be evaluated for minimum line weight according to certain embodiments.

FIG. 6 is a picture of the letter G with lines indicating the possible rows and columns that could be evaluated for minimum line weight according to certain embodiments.

FIG. 7 illustrates an exemplary determination of actual printed size of a pixel with an illustration of a 300 pixel by 150 pixel image to be printed in a 3 inch by 1.5 inch rectangle.

DETAILED DESCRIPTION OF THE PREFERRED EMBODIMENTS

Figures 1, 2:
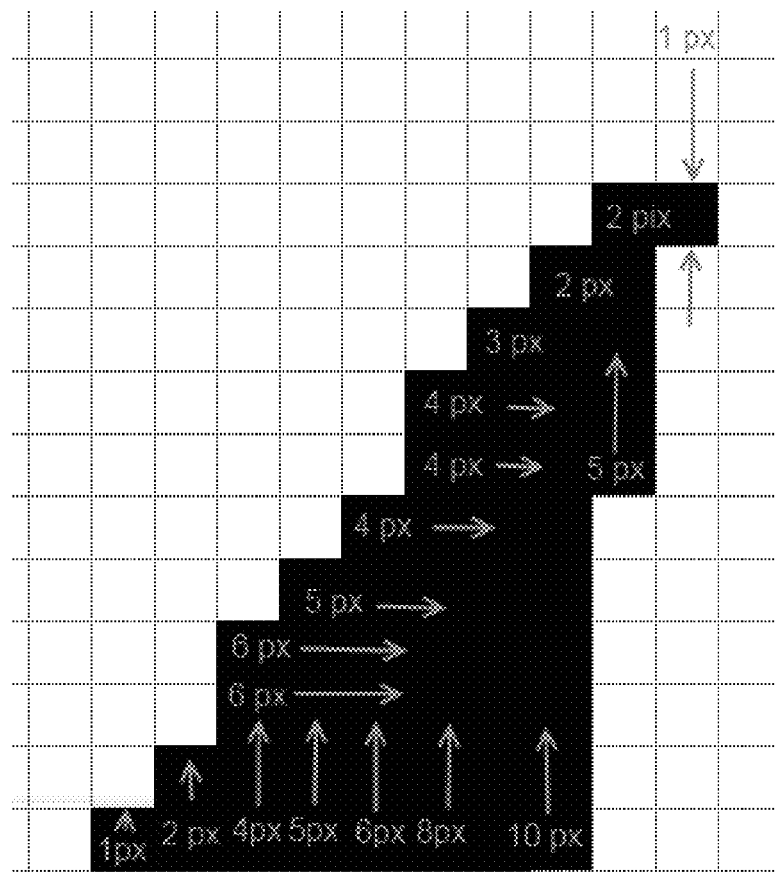
FIG. 1 shows an exemplary portion of a digitized image that may be evaluated according to certain embodiments.
FIG. 2 is a table showing the number of occurrences for each horizontal and vertical line weight found in FIG. 1.

The present invention relates to a method for evaluating the positive and negative line weights in an image or collection of images. In certain embodiments, the present invention relates to a method of automatically evaluating the positive and negative line weights in an image or collection of images. In yet other embodiments, the present invention relates to methods of automatically determining whether an image or collection of images are suitable for printing on a particular surface and/or using a particular technique or piece of printing equipment. Yet other embodiments are directed to a method and system for allowing customer to configure and order custom printed products without oversight from a graphic designer.

In one embodiment, the invention involves calculating the positive and negative line weights of an image or collection of images. Positive line weight is generally defined as the thickness of a printed line or element while negative line weight refers to the thickness of non printed space between two or more printed elements or between a printed element and the border of the surface on which the printing occurs. Positive line weight is important in printing because for any given printing process there is some minimum positive line weight that can be satisfactorily reproduced. Similarly, for any given printing process, there is some minimum negative line weight that determines the quality and clarity of the image. If any portion of the image or images to be printed contains any minimum positive or negative line weights less than the lowest threshold reproducible by the chosen printing technique, the finished product may be of poor quality.

To avoid this, the entire image composition (i.e., all images and/or text elements to be printed and spatial relationship between each element) may be converted into a single piece of artwork digitally representing the image composition. There are a wide variety of possible formats that could be used to represent the image composition digitally including, but not limited to, raster/pixel format, vector format, bitmap, etc. The "real-life" equivalent size of one pixel is then calculated based on, for example, a proposed printed size for the entire image composition. Thus, the "real-life" size of a pixel should be understood to be the size that a single pixel from the digital representation of the image composition would be if the entire composition were printed within a proposed area by the selected printing method.

This process is illustrated in FIG. 7, which shows a rectangular imprint area 3 inches by 1.5 inches in which a digital image composition 300 pixels by 150 pixels is to be printed. In this example, 3 inches divided by 300 pixels equals 0.01 inches per pixel, as does 1.5 inches divided by 150 pixels. Thus, the "real life" size of one pixel in this example is 0.01 inches. This can also be referred to as inches per pixel (IPP).

Once the "real-life" size of a single pixel is known, the relationship between each pixel and its adjacent pixels can be evaluated to determine the horizontal, vertical or diagonal width, or positive line weights, of all printed elements within the composition. From this information, the minimum positive line weight in the image composition may be determined and compared to the minimum positive line weight permitted by the chosen printing technique and/or desired printed size.

One possible embodiment of this process is illustrated in FIGS. 1, 2, and 3. FIG. 1 shows a portion of an image represented in pixels. Each horizontal and vertical row in the composition is evaluated to determine the number of pixels in that row. The number of pixels in each row corresponds to the positive line weight of that row in pixels. For example, 2 pixels equal a positive line weight of 2. To convert this line weight in pixels to a "real-life" line weight one would simply multiply the line weight in pixels by the "real-life" size (i.e. IPP) of a single pixel as determined by the process described above. FIG. 2 shows the number of occurrences in FIG. 1 for each positive line weight (in pixels) calculated for each horizontal and vertical row. FIG. 3 shows the total number of occurrences for each positive line weight (in pixels) calculated, whether horizontal or vertical. As FIG. 3 shows, the minimum positive line weight of this image, in pixels, is one pixel and that minimum line weight occurs two times in the image composition.

Evaluating minimum positive line weight in this manner can create some problems, however, depending on the image composition being evaluated. Images that contain vertex points (e.g., peak or triangle shapes), for example, may be problematic. When two lines or elements converge to form a vertex, conceptually the tip of the vertex is a single point of zero width. Practically speaking, however, the smallest digital representation of a point is one pixel. Thus, most or all vertex points may be digitally represented by a single pixel. If a positive line width of a single pixel is below the minimum line weight threshold for the selected printing size and technique, however, any image containing a vertex point may appear to be unprintable. In fact, this is not the case. Therefore it is desirable to have some way of identifying and filtering out minimum positive line weights associated with vertex points in the image composition.

One possible way to accomplish this is to analyze the digital representation of the image composition to determine whether any vertex points exist and, if so, the location of those vertex points. This may be accomplished by means of a visual inspection of the image composition or an automated pattern recognition algorithm. In either case, once the locations within the image composition of any vertex points are known, the line weights associated with those vertices can be ignored.

Another possible way to deal with the problem of vertex points is to discount the value of extremely small line widths that are likely the result of vertex points. This may be accomplished by determining a weighted mean of the pixel count occurrences in an image composition and using that as the minimum line weight value. One embodiment of this process first involves determining the number of discreet line weights (in pixels) present in the image being evaluated. For example, the image presented in FIG. 1 contains 8 discreet line weights (i.e., it contains line weights equaling 1, 2, 4, 5, 6, 7, 8, and 10 pixels). Therefore, the total "number of items" for calculating the weighted mean of FIG. 1 is 8. The total number of items is then multiplied by a preselected "waiver percentage" and rounded down to the nearest integer to generate an index value corresponding to the line weight that will be used as the minimum line weight value for the image composition. For example, FIG. 1 contains line weights equaling 1, 2, 4, 5, 6, 7, 8, and 10 pixels. Therefore, an index value of 0 would equate to a line weight of 1, an index value of 1 would equate to a line weight of 2, an index value of 2 would equate to a line weight of 4, and so on.

FIG. 4 illustrates the connection between the waiver percentage chosen, and the minimum line weight that would be returned for FIG. 1 for a chosen waiver percentage. Thus, if a waiver percentage of 0.265 is selected for evaluating the image composition of FIG. 1, an index value of two and a minimum line weight of 4 would be returned. This process can be automated, for example, by first defining an array called "Pixels" containing the value of each discreet line weight present in the image composition in ascending order. For FIG. 1, such an array might contain the following information:

| 1 | 2 | 4 | 5 | 6 | 7 | 8 | 10 |
| --- | --- | --- | --- | --- | --- | --- | --- |

A variable called "WaiverPercentage" may then be defined and set equal to the desired waiver percentage to be applied. A second variable called "NumberOfItems" is also defined and set equal to the length of the "Pixels" array. The following C code can then be used to determine the minimum line width that should be returned.

Index=floor(WaiverPercentage*NumberOfItems)
MinimumLineWidth=Pixels[Index]

This is but one example of how this algorithm may be automated and it is understood that many possible ways exist to automate this process including, but not limited to, developing a similar algorithm in another programming language, or embedding such an algorithm in hardware.

It will also be understood by those skilled in the art that the processes and examples cited above represent but one possible way of arriving at a weighted mean for a given image composition. Multiple ways to arrive at such a weighted mean exist. For example, in another possible embodiment the index value may be calculated by multiplying the preselected waiver percentage by the number of items and rounding to the nearest integer, rather than rounding down to the nearest integer. Other possible variation exists that will be clearly understood by those skilled in the art in light of this disclosure.

Calculating negative line weight is accomplished in a similar fashion to positive line weights. In one embodiment, the digital representation of the image composition is converted to an inverse image to create a new image composition representing the negative of the original. Thus, all formerly negative spaces are now represented as positive lines or what is referred to herein as "negative pixels". Then, just as before, the "real-life" equivalent size of one negative pixel, based on the selected printing area and technique, is calculated. Once the "real-life" size of a single negative pixel is known, the relationship between each pixel and its adjacent pixels can be evaluated to determine the horizontal, vertical or diagonal width, or negative line weights, of all printed elements within the composition. From this information, the minimum negative line weight in the image composition may be determined and compared to the minimum negative line weight permitted by the chosen printing technique and/or desired printed size. In most respects this process is identical to that followed to evaluate positive line weights. Vertex points appearing in the negative image are similarly analyzed and discounted according to one of the previously stated methods.

Figure 8:
FIG. 8 illustrates the rectangle of FIG. 7 displayed on top of a custom printable product.
Figure 9:
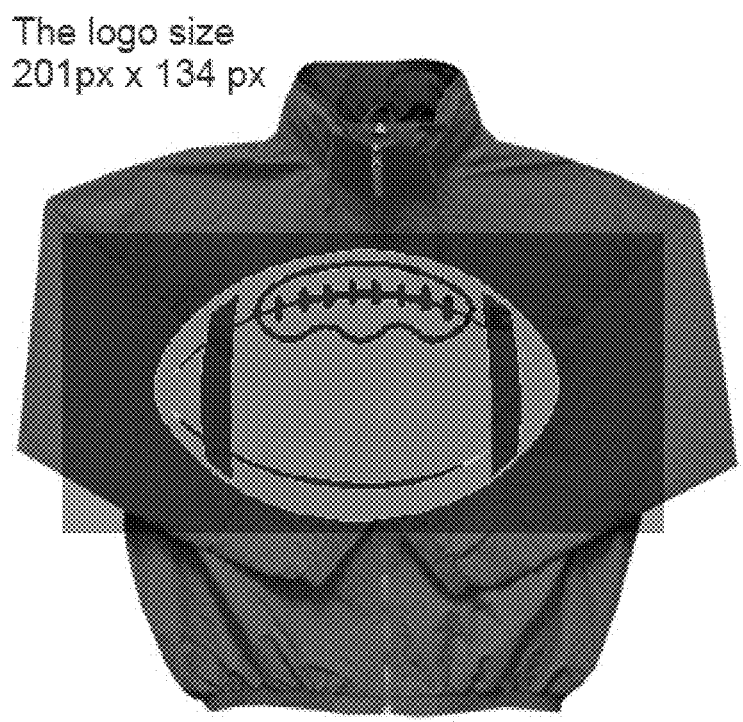
FIG. 9 illustrates an image of a football to be printed on a custom printable product.

One possible embodiment of this process is illustrated in FIGS. 5-6. FIG. 5, for example, shows a digital representation of a circle. The black line defining the circle 501 is the positive image and the white space inside and outside the circle is the negative image. It is this negative image that is evaluated to determine the negative line weight. Note, however, that the negative space between the positive image and the border of the printed space is not included in the calculation of negative line width. Thus, in both FIGS. 5 and 6, only the vertical and horizontal segments 502 and 601 are evaluated FIGS. 7-9 illustrate an example of the foregoing process. FIG. 7 shows a rectangle 701 representing a permissible imprint area. In this example it is 300 pixels by 150 pixels. FIG. 7 also illustrates that an actual imprint area of 3 inches by 1.5 inches is specified. Therefore each pixel represents 0.01 inches when actually printed (i.e., 3 inches/300 pixels=1.5 inches/150 pixels=0.01 inches per pixel). FIG. 8 then illustrates the size of the imprint area 701 on an actual object 801 to be printed. Often, however, the image composition submitted must be scaled to fit. For example, assume that the actual bitmap of the image composition submitted (in this case, a football 901) is 606 pixels by 402 pixels and it is desired to scale it down to 202 pixels by 134 pixels to make it fit within the permissible print area (see FIG. 9). In such a case, the scaling factor is 0.33 (i.e., 202/606=134/402=0.33). In this example it is also assumed that the composition's minimum positive line weight is 12 pixels and the minimum negative line weight is 9 pixels.

Given the above information the minimum positive and negative line weights in inches can now be calculated. The IPP=0.01 and the scaling factor=0.33, therefore the minimum positive line width equals:

12*0.33*0.01=0.04 inches

Likewise, the minimum negative line width in inches equals:

9*0.33*0.01=0.03 inches

As long as these values are permissible given the printing process selected, the image can then to be printed.

Note as well that certain other information about the printed image can be calculated. Assume here that the image of FIG. 9 contains 200,000 non-empty pixels (i.e., positive pixels) out of the total 243,612 pixels in the image (i.e., 606 pixels*402 pixels). From this it is possible to determine the print area of the image by multiplying the number of non-empty pixels by the square of the scale factor and the square of the IPP. In this case, that yields a printed area of 2.22 square inches (i.e., 200,000*0.33*0.33*0.01*0.01=2.22 square inches).

One advantage of the above method for evaluating positive and negative line weights is that it is well suited to automation so that a determination can be made automatically as to whether a given image composition is suitable for printing in a particular space and/or by a particular method. This is particularly useful in taking orders for printing of custom promotional items, particularly where it is desirable to determine whether a customer's image composition is suitable for printing without the need for a trained human to evaluate the composition.

Therefore, another embodiment of the invention is directed to an automated submittal and evaluation process and/or device wherein a customer can submit an image composition and select the items on which the customer would like the composition printed. In general, the present embodiment relates to design of custom printed products and promotional items. Certain parameters are selected. Objects are associated with the parameters, such that selection of the certain parameters causes the associated objects to be called. Design rules are then applied to the associated objects to create a design. Typically, the design rules are knowledge-based and apply certain rules to the creation of the design. Examples of these rules include, but are not limited to, the methods of calculating positive and negative line weights, and identifying and discounting vertex points as taught in this disclosure.

Figure 10:
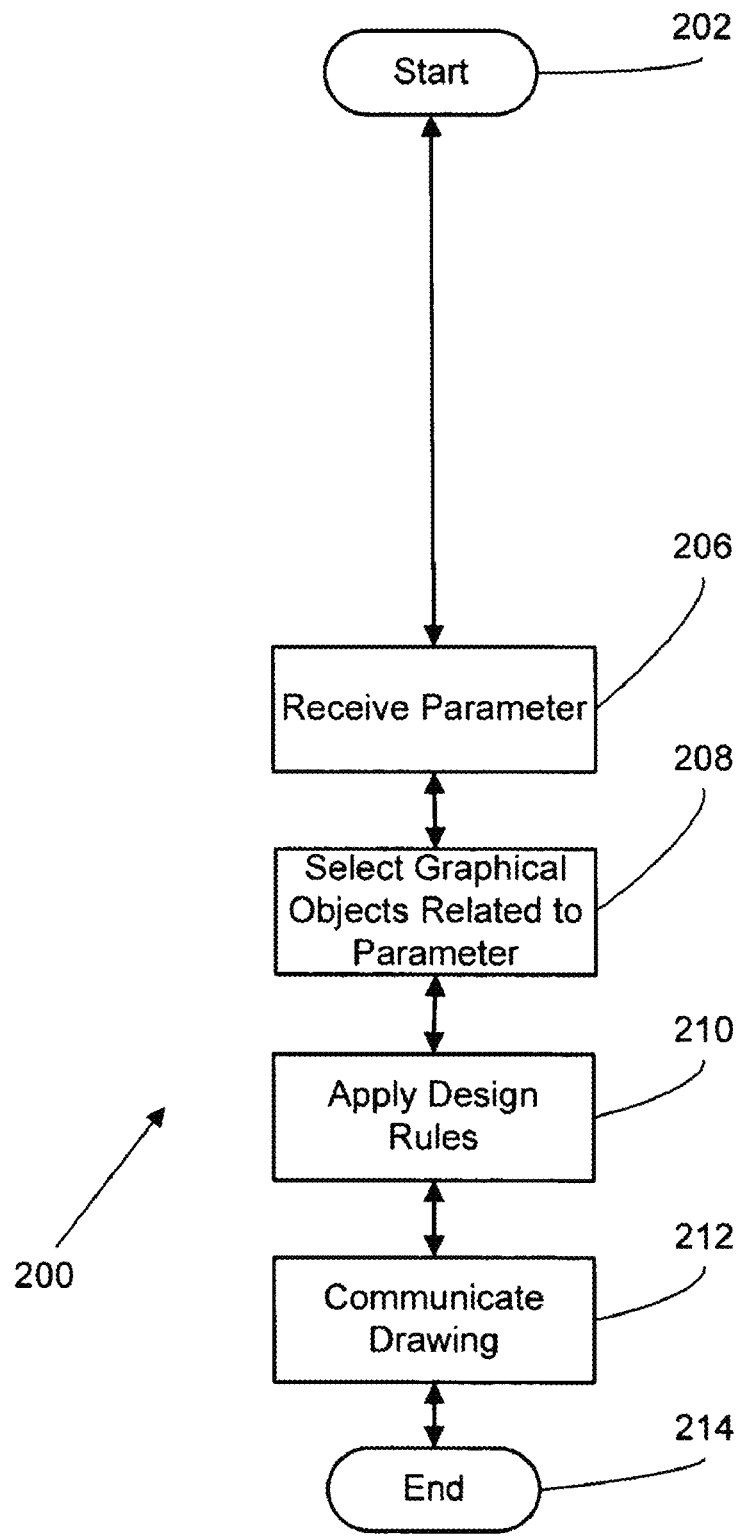
FIG. 10 is a block diagram of methods and systems for processing and evaluation of a custom printed product according to certain embodiments.

Referring now to FIG. 10, a block diagram of methods and systems 200 for design of a customizable product is shown according to a possible embodiment of the present disclosure. Operational flow of the system 200 begins at a start operation 202. Operational flow proceeds to a receive operation 206. The receive operation 206 receives sales codes related to requested features desired by a potential purchaser of the customizable product. By the term "sales codes" or "parameters" herein, it is meant sales codes, option identifiers, or parameters. The requested features are a subset of those features for which sales codes are assigned and design options are available. A design option refers to the choice between the presence or absence of various features of the customizable product, or selection among a group of inconsistent features. For example, printing color would be considered a design option for which a custom printed product would have at least two configurations available.

Preferably, receive operation 206 receives the sales codes from a web utility, such as a web portal or other generalized user interface. The web portal can present the prospective purchaser or a dealer with one or more screens in which the user of the web portal can choose one or more design options. The web portal also contains means of transmitting the desired image composition. There are many means of transmitting an image composition known to those skilled in the art. For example, the composition may be sent via email, FTP, or some other upload protocol if the image exists natively in a digital format. If the composition is not in a digital format, it may be scanned, or digitally photographed and then transmitted via any appropriate method. These are but examples, and it is understood that those skilled in the art will recognize that other equivalent transmission methods exist.

Select operation 208 selects or accesses graphical objects associated with, or related to, the sales codes. Graphical objects refer to stored drawings or portions of drawings that relate to the specific products or examples to be represented. For example, a graphical object of a jacket may be stored as a self-contained module. A second jacket in another color can be stored as well, where the two jackets are distinguishable based on a customizable characteristic (e.g., color).

In another possible embodiment, a graphical object is data, such as a set of coordinates in a computer-aided drawing program, such as AutoCAD or other system, which in turn creates a drawing of a custom printed product or a portion thereof. Preferably, sales codes refer to identifiers related to specific identifying or customizable features of a custom printed product that would distinguish that product from other products and/or other permutations of the same custom printed product. The graphical objects relate to the sales codes in that the sales code representing a specific selectable feature of the custom printed product corresponds to a graphical object displaying that feature.

In an example of a jacket customized for a particular customer, a sales code corresponding to a red jacket corresponds to a graphical object of a jacket in the color red. A sales code corresponding to a green jacket corresponds to a graphical object of a jacket in green. By selecting one of the sales codes, the corresponding graphical object is selected as well.

Select operation 208 loads the graphical objects in preparation for processing in design rules operation 210. In a possible embodiment, system 200 includes default graphical objects to be used for a custom printed product for which no design option is selected and no sales code is provided. In a second possible embodiment, the user interface is configured to produce sales codes for system 200 regardless of whether all design options are selected by generating default sales codes. In a third possible embodiment, if particular options are not selected and no sales code is provided, an alert can be generated to the user that such information is required.

Consider, for example, that every printable product has some maximum available printable space. In this embodiment where the composition's minimum line weights are calculated first, the customer interface may be configured to only present those objects with sufficient printable space to accommodate the composition while not violating the minimum line weight thresholds. Alternatively, where a variety of printing techniques are potentially possible, the customer may be permitted to choose only from those methods that will allow satisfactory printing of his or her composition in light of the minimum positive and negative line weights it contains. These are but a few examples of how various design options and sales codes may be handled.

Design rules operation 210 may apply one or more design rules configured to accommodate the sales codes received by system 200. Preferably design rules refer to computer-implemented rules defined in system 200 that are used to form a custom printed product. Typically, the design rules are knowledge-based rules and indicate how the graphical objects interrelate, and can act as a restraint upon specific configurations of graphical objects such that a practical design of the customizable product is accomplished via an at least partly computerized process. At lease one of these design rules may be an evaluation of the image composition's positive and negative line weights according to the methods previously described. Design rules operation 210 may apply the design rules to the graphical objects determined and image composition received using receive module 208. Design rules module 210 thereby creates a proposed design drawing for the custom printed product that integrates the design options desired including the image composition.

A wide variety of design rules can be used, and can relate to a variety of best practices known by the manufacturers of the custom printed product. These best practices correspond to the design rules applied in the design rules operation 210. The design rules therefore provide a knowledge-based system for accomplishing a large portion of the initial design process.

In an example implementation of a design rules operation 210 used to create a proposed design drawing for a jacket, a design rule may be related to the jacket's size. Options affecting the jacket's size, such as the color when certain colors are available only in certain sizes, may be changed due to a customizable option, but not to the extent that the size requirement is compromised. Minimum permissible line widths for a particular product or printing process are other examples of such design rules. Thus, for example, a customer would not be permitted to select an object for custom printing or a printing method when such a selection would violate the minimum line width requirement for that product or method in light of the submitted image composition.

Operational flow proceeds to a communicate operation 212. The communicate operation 212 communicates a drawing created in the design rules module 210. The drawing is a proposed design drawing of the custom printed product, and reflects the design options selected by a user of the system 200. In one embodiment, the communicate operation 212 transmits the proposed design drawing to a remote computer, where it can be accessed by a user of the system such as a dealer, or a prospective purchaser. In a further embodiment, the communication module 212 causes the proposed design drawing to be displayed locally for further review by design and/or validation by a design group.

Operational flow terminates at an end operation 214.

Figure 11:
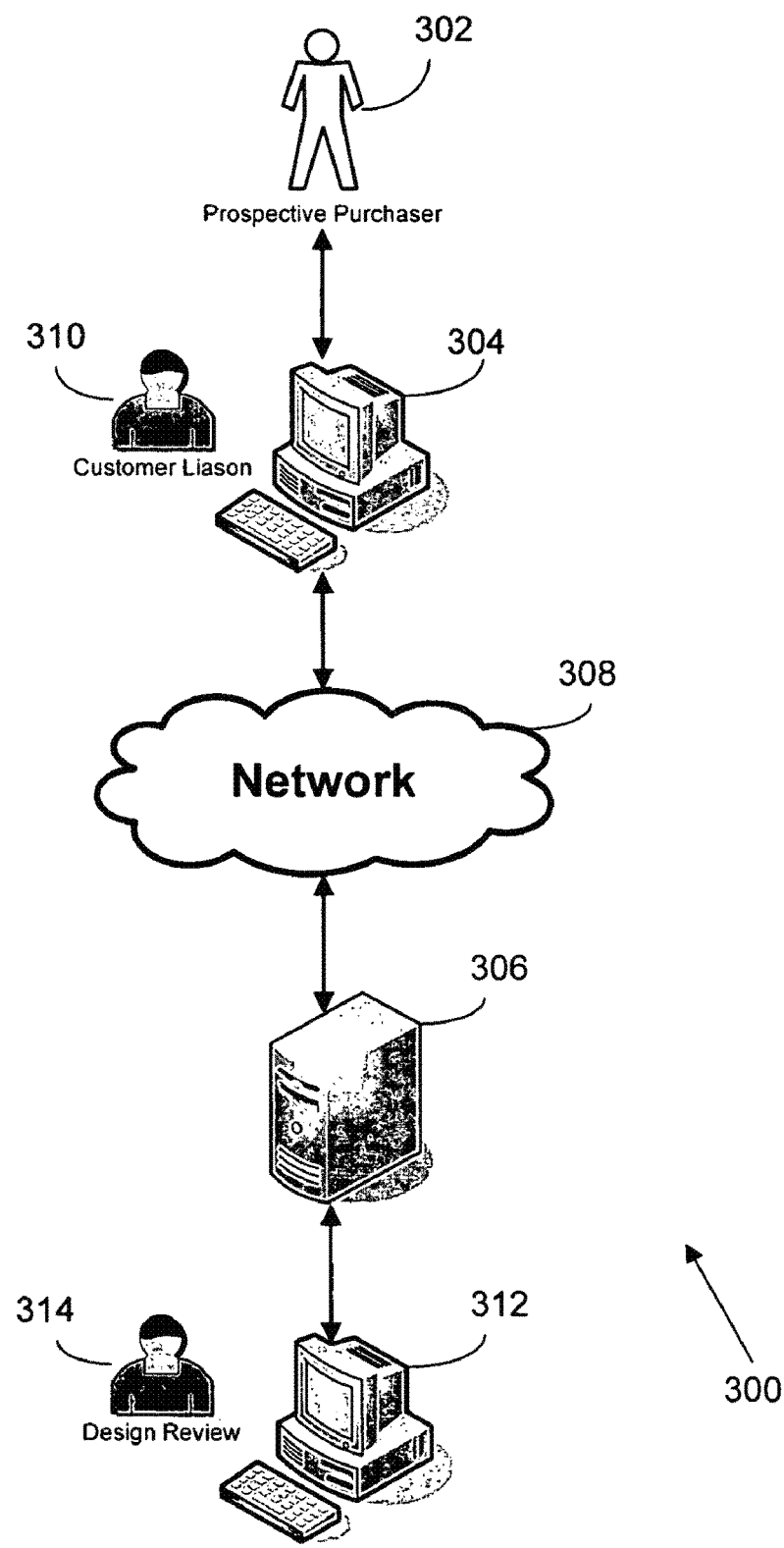
FIG. 11 is a schematic representation of an exemplary network system usable by a customer to request a custom printed product.

Referring now to FIG. 11, a schematic representation of an exemplary network system useable by an end-user, or customer, to request a custom printed product is shown. Preferably, the network system 300 interfaces with a prospective purchaser 302, such as a private or governmental individual or entity. In one possible embodiment, the prospective purchaser 302 is a prospective purchaser of custom printed promotional items or other custom printed objects. The prospective purchaser 302 defines the design options by using a computing system 304 interfaced to a server 306 via a network 308. Optionally, a customer liaison 310, such as a dealer for the custom printed product, assists the prospective purchaser by receiving design requirements from the user and entering the user information into the computing system 304. The computing system 304 can be a thin client system, a kiosk-type system such as CITRIX or AJAX, or a "thick" personal computing system capable of hosting one or more applications. Such systems are known to those of ordinary skill in the art.

Preferably, the server 306 is a file/database server, and can optionally be configured to act as a web content server as well, such that the user interface is hosted from the server 306 to a client system, such as the computing system 304. The server 306 also stores a plurality of design rules, graphical objects, and sales codes, as described above. In a possible embodiment, the server 306 is a web and database server configured using a web-enabled database management system to present a user interface to a browser displayed on a display of a client computing system, such as the computing system 304. In one embodiment, the user interface is a web portal. In a further embodiment, the user interface resides on the computing system 304 and data is shared across the network 308.

The network 308 linking the server 306 and computing system 304 can be any communications link or a number of internet, WAN, LAN, or other types of TCP/IP or other networking protocols configured to provide a communication link between the systems.

Optionally, one or more computing systems 312 link to the server 306 via some type of network or communication link. An individual or team of individuals assigned to design overview 314 can use these computing systems to test and/or validate the design of the customizable product.

Figure 12:
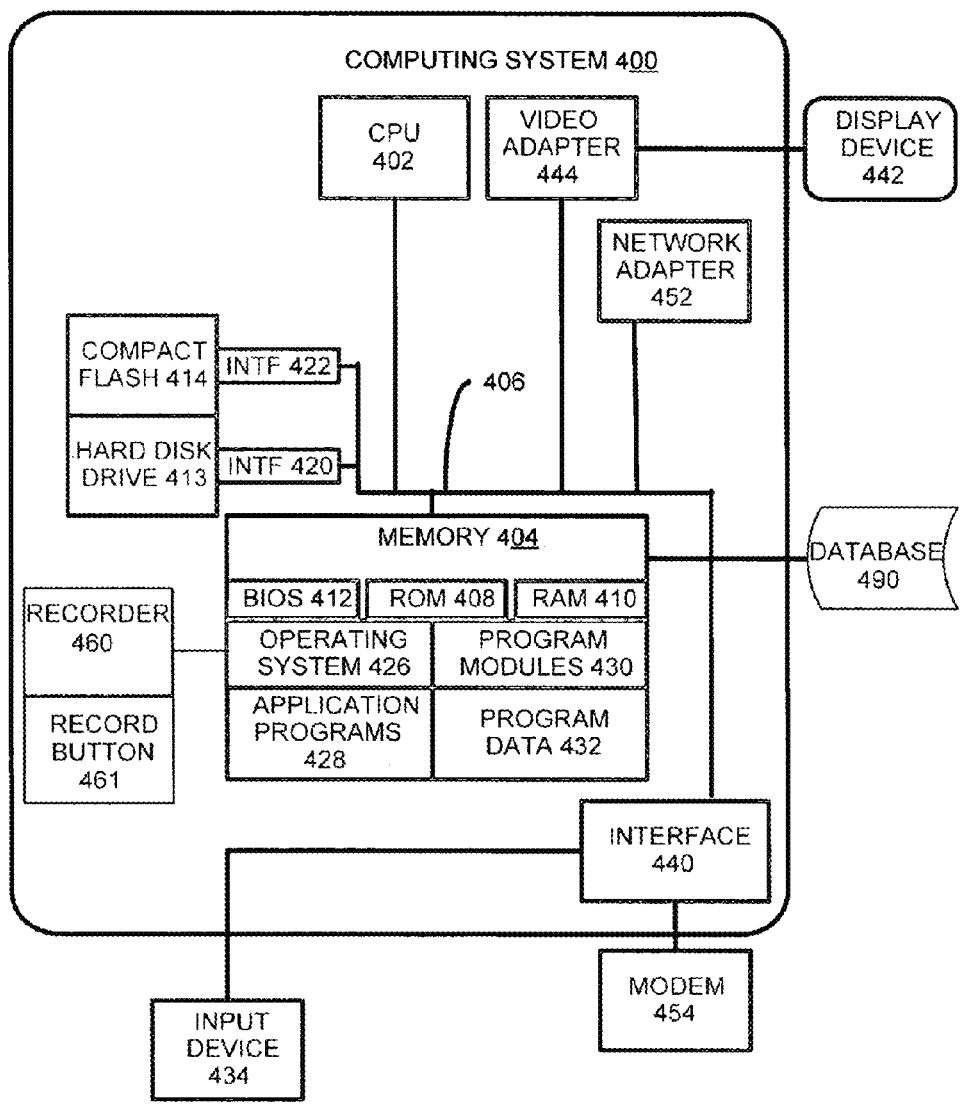
FIG. 12 is a schematic representation of a computing system.

FIG. 12 illustrates an exemplary architecture for a computing system that can be used to implement aspects of the present disclosure, such as the computing systems 304, 312 or the server 306 of FIG. 11. The computing system architecture includes a general purpose computing device in the form of a computing system 400. The computing system 400 can be used, for example, as the computing system or server of FIG. 10, and can execute program modules included in the administrative software or user software disclosed below.

The computing system 400 including at least one processing system 402. A variety of processing units are available from a variety of manufacturers, for example, Intel or Advanced Micro Devices. The computing system 400 also includes a system memory 404, and a system bus 406 that couples various system components including the system memory 404 to the processing unit 402. The system bus 406 may be any of a number of types of bus structures including a memory bus, or memory controller; a peripheral bus; and a local bus using any of a variety of bus architectures.

The system memory 404 can include read only memory (ROM) 408 and random access memory (RAM) 410. A basic input/output system 412 (BIOS), containing the basic routines that help transfer information between elements within the computing system 400, such as during start up, is typically stored in the ROM 408.

The computing system 400 can also include a secondary storage device 413, such as a hard disk drive, for reading from and writing to a hard disk (not shown), and/or a compact flash card 414.

The hard disk drive 413 and compact flash card 414 are connected to the system bus 406 by a hard disk drive interface 420 and a compact flash card interface 422, respectively. The drives and cards and their associated computer readable media provide nonvolatile storage of computer readable instructions, data structures, program modules and other data for the computing system 400.

Although the exemplary environment described herein employs a hard disk drive 413 and a compact flash card 414, other types of computer-readable media, capable of storing data, can be used in the exemplary system. Examples of these other types of computer-readable mediums include magnetic cassettes, flash memory cards, digital video disks, Bernoulli cartridges, CD ROMS, DVD ROMS, random access memories (RAMs), or read only memories (ROMs).

A number of program modules may be stored on the hard disk 413, compact flash card 414, ROM 408, or RAM 410, including an operating system 426, one or more application programs 428, other program modules 430, and program data 432. A user may enter commands and information into the computing system 400 through an input device 434. Examples of input devices might include a keyboard, mouse, microphone, joystick, game pad, satellite dish, scanner, digital camera, touch screen, and a telephone. These and other input devices are often connected to the processing unit 402 through an interface 440 that is coupled to the system bus 406. These input devices also might be connected by any number of interfaces, such as a parallel port, serial port, game port, or a universal serial bus (USB). Wireless communication between input devices and interfaces 440 is possible as well, and can include infrared, Bluetooth, 802.11a/b/g, cellular, or other radio frequency communication systems. A display device 442, such as a monitor or touch screen LCD panel, is also connected to the system bus 406 via an interface, such as a video adapter 444. The display device 442 might be internal or external. In addition to the display device 442, computing systems, in general, typically include other peripheral devices (not shown), such as speakers, printers, and palm devices.

When used in a LAN networking environment, the computing system 400 is connected to the local network through a network interface or adapter 452. When used in a WAN networking environment, such as the Internet, the computing system 400 typically includes a modem 454 or other communications type, such as a direct connection, for establishing communications over the wide area network. The modem 454, which can be internal or external, is connected to the system bus 406 via the interface 440. In a networked environment, program modules depicted relative to the computing system 400, or portions thereof, may be stored in a remote memory storage device. It will be appreciated that the network connections shown are exemplary and other methods of establishing a communications link between the computing systems may be used.

The computing system 400 might also include a recorder 460 connected to the memory 404. The recorder 460 includes a microphone for receiving sound input and is in communication with the memory 404 for buffering and storing the sound input. The recorder 460 also can include a record button 461 for activating the microphone and communicating the sound input to the memory 404.

A computing device, such as computing system 400, typically includes at least some form of computer-readable media. Computer readable media can be any available media that can be accessed by the computing system 400. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the computing system 400.

Communication media typically embodies computer-readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Figure 13:
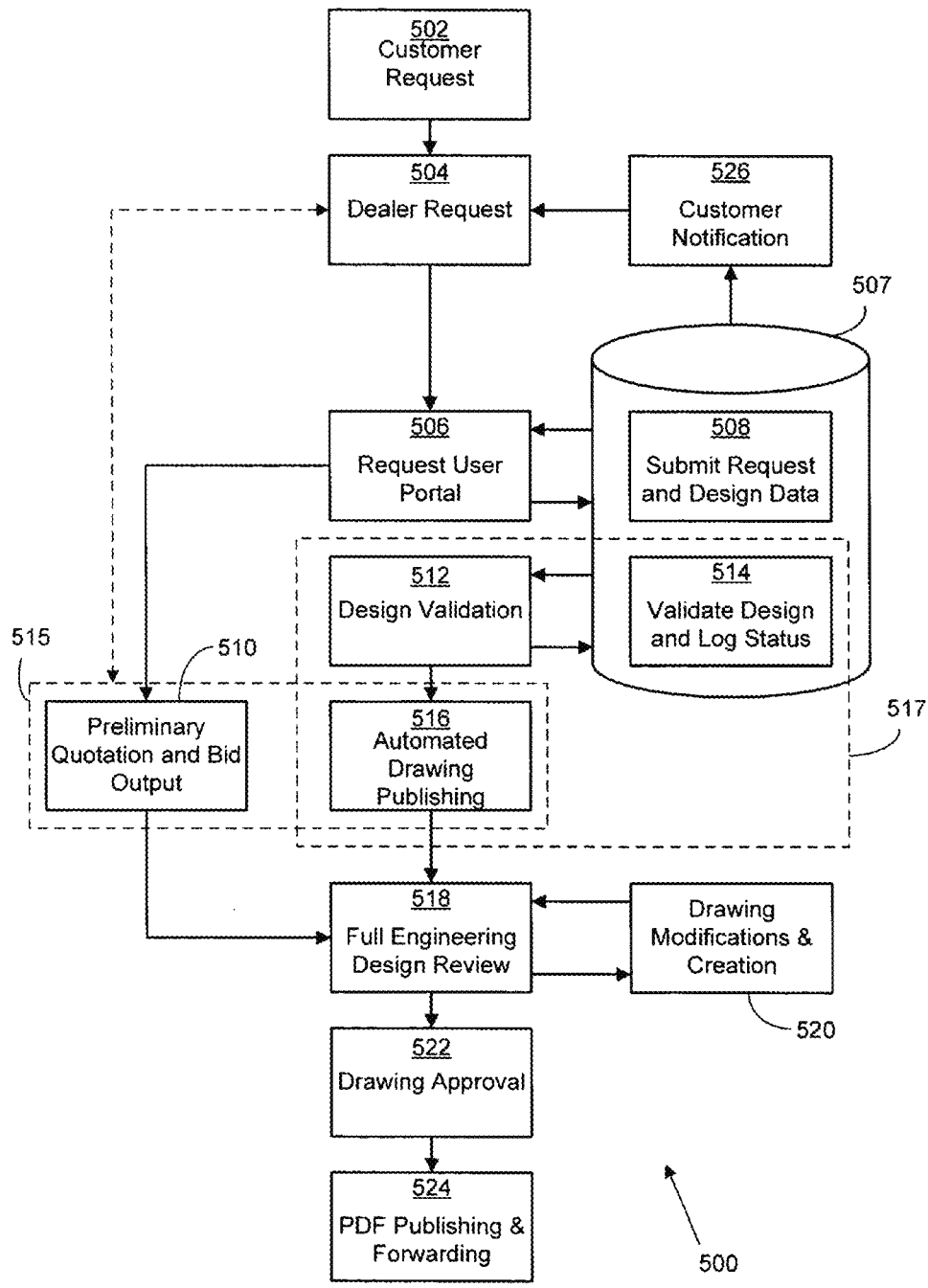
FIG. 13 is a block diagram of a system for evaluating a custom printed product configuration proposal according to certain embodiments.

FIG. 13 displays a block diagram of a system 500 for price quotation and design according to a possible embodiment of the present disclosure. The system 500 generally provides a logical structure by which design of a custom printed product takes place. The system 500 can operate across the system 300 of FIG. 11, although additional or alternate configurations can also be used.

The system 500 includes a customer request operation 502. The customer request operation 502 represents the interaction between the prospective purchaser 302 and the computing system 304 of FIG. 11, optionally including customer liaison 310. A prospective purchaser communicates with the customer liaison, such as a dealer of the custom printed product, who in turn operates the user interface. A dealer request operation 504 represents the dealer or other customer liaison receiving instructions, or requests, from the customer, such as design option preferences or other cost/design parameters, and forming a request for a design drawing and price quotation.

The user interface, or portal, presented to the customer 302 or customer liaison 310 allows for entry of the customer request into the computing system 304 of FIG. 11. The portal can be an application based portal residing on the computing system and sharing data with the server 306 of FIG. 11. Alternately, the user interface can be a web-based user interface configured to display design options to the user of the portal via a web browser, such as Microsoft Internet Explorer, Mozilla Firefox, Opera, or other web browsing software. In one implementation of a web portal, the user interface is an ASP web client.

Request and design data received from the customer 302 or customer liaison 310 is converted into sales data and shared with an automated drawing module 506 and an output module 510. Sales data refers to one or more sales codes corresponding to the design options selected using the portal. The output module 510 provides a final proposed design drawing to the user.

The automated drawing module 506 and output module 510 both interface with a design database 507. The database can be any of a number of commercially available databases, and in one possible embodiment is a SQL relational database management system (DBMS). In one implementation, an Oracle SQL database is used, and VB.NET programming provides a common communication language between the user interface and the design database 507. Preferably, the design database 507 contains defined sales codes, design options, and correlations to graphical objects related to the custom printed product or products.

The user interface, or portal, presents design options to the user to form a custom printed product. The portal submits to automated drawing module 506 and output module 510 the user's selected design options. The portal can be configured to require a full set of design options, such that the set of design options defines a possible layout of a custom printed product. If a custom printed product cannot be defined based on the design options selected, the portal optionally displays a form to prompt the user to select the remaining design options necessary to define the custom printed product. In an alternative embodiment, system 500 assigns default design options for each of the unselected design options.

Automated drawing module 506 generates a drawing based on the sales data and image composition provided via the portal either before or after evaluating the image composition according one of the methods of this disclosure to determine if it is suitable for printing on the custom printed product selected. The automated drawing module 506 receives the sales data entered into the user interface and correlates the sales data to graphical objects stored in a drawing block library 512. The correlation information can be located within the automated drawing module 506, design database 507, or drawing block library 512. The automated drawing module 506 applies design rules to the graphical objects to form a proposed design drawing based on requested parameters. The design rules define which graphical objects are used, and how the graphical objects are formed into the proposed design drawing of the custom printed product.

In one possible embodiment, the graphical objects stored in the drawing block library 512 include pre-designed graphical features. In a further possible embodiment, the graphical objects include pre-programmed routines which define a method by which the graphical objects are drawn.

Preferably, the design options selected using the portal correlate to sales codes, which in turn correlate to graphical objects stored in the drawing block library 512, as described above, such as via tables in a relational database accessed by the automated drawing module 506. For example, a schema containing a table of sales codes could reference a fact table containing graphical objects. In another example, the sales codes are stored separately in the design database and accessed by the automated drawing module 506 for correlation to graphical objects stored in the drawing block library 512. Other configurations or methodologies for storing design rules and correlations could be used as well. The system 500 is configured to apply design rules to the graphical object to form a design based on requested parameters. The proposed design drawing can be, for example, a collection of preferences embodied as graphical objects. In a possible embodiment, the design database 507 or automated drawing module 506 resident upon the server 306 of FIG. 3 triggers the design process. In a further possible embodiment, the design process is triggered externally to the server.

Preferably, output operation 510 stores the graphical objects and associated information stored in design database 507 for retrieval by a customer or dealer via the portal. In another possible embodiment, output operation 510 stores the graphical objects in an external memory to design database 507, such as in server 306 or a computing system 304, 312. The associated information includes, for example, prices for the selected custom printed product, or print layout information.

The system 500 optionally validates the proposed design as well. The system 500 automates application of one or more design rules to it to verify that the design is technically feasible. By technically feasible, it is intended that the design meet the criteria set by the prospective purchaser in the customer request operation 502, while also meeting the constraints mandated by the physical size and shape of the custom printed object selected, and the technical limits of the printing process selected. Examples of such design rules include, but are not limited to, minimum positive line weight checking, minimum negative line weight checking, and peak/vertex checking and filtering according to the methods of this disclosure. System 500 passes or fails the generated design. A log within the design database 507 stores data regarding the design validation process, such as steps taken to validate the design, rules applied, and outcome (i.e. pass or failure of the design according to one or more design rules). System 500 therefore ensures that output operation 510 and automated drawing creation module 506 provide a validated design that corresponds to the price and part quotation output from output operation 510 and proposed design drawing from automated drawing creation module 506.

A notification operation 526 notifies the prospective purchaser that the proposed design drawing and price quotation are prepared and can be viewed. In one embodiment, the notification operation 526 transmits the proposed design drawing and price quotation to the user directly. In another embodiment, the proposed design drawing and price quotation return to the portal for viewing by the dealer and/or prospective purchaser. In a third embodiment, the proposed design drawing and price quotation are stored on a server for retrieval by the user, such as in design database 507. In an alternate embodiment, the notification module notifies a user about additional information needed by the design database 507 as necessary to form the proposed design, above.

The dealer or other portal user can use the portal to iteratively change design parameters and receive proposed design drawings and price quotations without requiring interaction from a designer or other employee of the dealer. When the dealer or customer arrives at a combination of design options which correspond to a proposed design and price quotation acceptable to the customer, the customer or dealer can approve the design in the portal.

Once the proposed design is approved, an optional design review operation 518 is instantiated. The design review operation 518 represents a number of resources used to fully validate the design generated using the portal, database, design options, sales codes, graphical objects, and design rules. In one embodiment, a design review team comprised of designers reviews the computer-generated proposed design drawing and price quotation for accuracy and completeness. A modification operation 520 represents modification work required based on missing or invalid sales codes as generated using the automated process. In a possible embodiment, the drawing modifications during the design review correspond to modification of the graphical objects, sales codes, or design rules such that future proposed design drawings and price quotations do not require the same changes. For example, additional design rules are created by the design review team such that design review needs decrease with use of the system 500. In one embodiment, the design review operation 518 and the modification operation 520 operate iteratively, in that the modified drawing then receives full design review in the design review operation 518.

An optional approval operation 522 represents final approval of the design following a full design review. In one embodiment the approval operation 522 indicates that one or more individuals have approved the design. The individuals can be, for example designers, customers, or dealers. In a further embodiment, the approval module 522 indicates that a computerized validation process has successfully evaluated the design for the custom printed product including the customer provided image composition following the full design review.

A publishing operation 524 compiles the approved design drawing, and optionally also compiles a price quotation. The publishing operation 524 prepares the design drawing for viewing by the dealer and/or prospective purchaser, and for transmission to a user via a network or to the user portal. In a possible embodiment, the publishing operation 524 prepares a document in PDF format (Portable Document Format, by Adobe Systems, Inc.) incorporating the approved design drawing and/or the quotation. Other document formats can be used as well. In a possible embodiment, the format of the document provided to the user is an option presented to the user in the user portal, and the document is formatted accordingly prior to transmission to the user.

The design database 507 optionally also stores information related to the rate at which a prospective purchaser accepts the bid and proposed design. This information, referred to herein as the success rate of the system, can include information related to the number of proposals generated, the number of proposals generated for a particular purchaser, the size or cost of the order accepted and/or rejected, and other data. Developers access this information to improve the process performed by the system 500 as well as to improve offerings, such as design options available for the custom printed product.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

The invention claimed is:

1. A computerized method of automatically evaluating suitability of an image composition for reproduction, the method comprising:
    receiving the image composition;
    multiplying an actual size of a pixel by a number of positive pixels in each of the horizontal rows of the image composition and each of the vertical rows of the image composition to determine a positive line weight of each of the horizontal rows and each of the vertical rows;
    receiving a predetermined minimum permissible positive line weight for the image composition; and
    comparing, by one or more processors, the positive line weight of each of the horizontal rows and each of the vertical rows to the predetermined minimum permissible positive line weight.

2. The method of claim 1, further comprising converting the image composition to a pixel format image composition.

3. The method of claim 1, wherein positive line weight is the thickness of a printed line or element.

4. The method of claim 1, wherein calculating the actual size of a pixel further comprises determining a horizontal imprint area of the image composition and dividing by the number of horizontal pixels in the image composition or determining a vertical imprint area of the image composition and dividing by the number of vertical pixels in the image composition.

5. The method of claim 1, further comprising:
    determining the number of horizontal rows of pixels;
    determining the number of vertical rows of pixels;
    determining the number of positive pixels in each of the horizontal rows; and
    determining the number of positive pixels in each of the vertical rows.

6. The method of claim 1, further comprising converting the image composition to a negative image for determining negative line weight of each of the horizontal rows and each of the vertical rows.

7. The method of claim 1, further comprising identifying all vertex points in the image composition, and excluding any line weights associated with the vertex points from consideration when determining the line weights of each of the horizontal rows and each of the vertical rows.

8. The method of claim 7, wherein said vertex points are identified by image pattern recognition software.

9. The method of claim 1, further comprising:
    determining a weighted mean of all discrete pixel count occurrences in the image composition, wherein the weighted mean is calculated by the following steps:
        defining a waiver percentage wherein said waiver percentage is a value between 0 and 1;
        assigning index values, starting with 0 and continuing with natural numbers in increasing order, to each discrete line weight, in pixels, occurring within the image composition;
        multiplying said waiver percentage by the number of discrete line weights occurring in the image composition and rounding the result down to the nearest integer value defining a calculated index value to one of the index values previously assigned;
        setting the line weight associated with said calculated index value as the minimum line weight in said image composition and
        comparing the minimum line weights to a predetermined minimum permissible line weight.

10. The method of claim 1, further comprising:
    receiving one or more selected parameters; and
    evaluating whether the image composition can be reproduced based on the one or more selected parameters.

11. The method of claim 10, wherein the one or more parameters depend on the materials on which the image composition needs to be reproduced.

12. The method of claim 10, wherein the one or more parameters are sales options associated with a plurality of custom printable products.

13. The method of claim 10, further comprising:
    accessing one or more graphical objects associated with the one or more selected parameters; and
    applying one or more design rules to the one or more graphical objects to generate a proposed design drawing.

14. The method of claim 13, wherein said one or more design rules includes at least one rule comprising minimum permissible line weights in the image composition.

15. The method of claim 13, wherein said one or more design rules define which graphical objects are used, and how the graphical objects are formed into the proposed design drawing.

16. The method of claim 13, further comprising outputting a determination of suitability of an image composition for reproduction.

17. The method of claim 13, further comprising storing the proposed design drawing in a database.

18. The method of claim 1, further comprising determining suitability of an image composition for reproduction.

19. The method of claim 1, further comprising outputting a determination of suitability of an image composition for reproduction.

* * * * *